United States Patent
Kuwajima et al.

(10) Patent No.: US 11,781,003 B2
(45) Date of Patent: Oct. 10, 2023

(54) FLUORORESIN AND MOLDED OBJECT

(71) Applicant: DAIKIN INDUSTRIES, LTD., Osaka (JP)

(72) Inventors: Yuuki Kuwajima, Osaka (JP); Hayato Tsuda, Osaka (JP); Kazuki Hosoda, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 918 days.

(21) Appl. No.: 16/477,401

(22) PCT Filed: Dec. 4, 2017

(86) PCT No.: PCT/JP2017/043441
§ 371 (c)(1),
(2) Date: Jul. 11, 2019

(87) PCT Pub. No.: WO2018/131327
PCT Pub. Date: Jul. 19, 2018

(65) Prior Publication Data
US 2019/0338114 A1  Nov. 7, 2019

(30) Foreign Application Priority Data

Jan. 12, 2017  (JP) ................ 2017-003459

(51) Int. Cl.
*C08F 214/18* (2006.01)
*C08F 214/22* (2006.01)
*C08F 214/26* (2006.01)
*C08L 27/16* (2006.01)
*C08L 27/18* (2006.01)

(52) U.S. Cl.
CPC .......... *C08L 27/18* (2013.01); *C08F 214/182* (2013.01); *C08F 214/22* (2013.01); *C08F 214/26* (2013.01); *C08L 27/16* (2013.01); *C08L 2203/16* (2013.01); *C08L 2203/18* (2013.01)

(58) Field of Classification Search
CPC .. C08F 214/262; C08F 214/26; C08F 214/22; C08F 214/202; C08F 6/28
See application file for complete search history.

(56) References Cited

U.S. PATENT DOCUMENTS

2012/0015124 A1   1/2012  Kitahara et al.

FOREIGN PATENT DOCUMENTS

JP   2005-089524 A   4/2005
WO   2010/110129 A1   9/2010

OTHER PUBLICATIONS

International Preliminary Report on Patentability with the translation of Written Opinion dated Jul. 16, 2019 issued by the International Bureau in No. PCT/JP2017/043441.
International Search Report of PCT/JP2017/043441 dated Feb. 20, 2018.

*Primary Examiner* — Irina S Zemel
*Assistant Examiner* — Jeffrey S Lenihan
(74) *Attorney, Agent, or Firm* — Sughrue Mion, PLLC

(57) ABSTRACT

A fluororesin including a vinylidene fluoride unit and a tetrafluoroethylene unit. The fluororesin has a gas chromatography-mass spectrometry total ion chromatogram including a peak which is assigned to a component having a molecular weight of 202 to 903 and which has a peak intensity of 1000 or lower. Also disclosed is a molded article formed from the fluororesin.

4 Claims, No Drawings

FLUORORESIN AND MOLDED OBJECT

CROSS REFERENCE TO RELATED APPLICATIONS

This application is a National Stage of International Application No. PCT/JP2017/043441 filed Dec. 4, 2017, claiming priority based on Japanese Patent Application No. 2017-003459 filed Jan. 12, 2017.

TECHNICAL FIELD

The invention relates to fluororesins and molded articles.

BACKGROUND ART

Pipes used for offshore oil fields include risers (pipes for pumping up crude oil), umbilicals (integration of pipes for supplying chemicals for crude oil viscosity reduction for the purpose of controlling the pumping, power cables, and others), flowlines (pipes for transporting pumped crude oil which extend on the sea floor), and the like. They have various structures, and known pipes include metallic pipes and metal/resin hybrid pipes. In order to achieve weight reduction of pipes, use of metallic pipes tends to be reduced and metal/resin hybrid pipes are becoming the mainstream. Oil drilling sites have become much deeper, so that the temperature of crude oil pumped therefrom rises. Thus, resins used for these pipes need to have better mechanical strength and chemical resistance at high temperatures (resistance to high-temperature crude oil, resistance to acidic gas, such as hydrogen sulfide, contained in crude oil at high temperatures, resistance to chemicals such as methanol, $CO_2$, and hydrogen chloride injected so as to reduce the crude oil viscosity at high temperatures), and lower permeability at high temperatures. Thus, there is a demand for materials which can take the place of polyamide (operating temperature range: up to 90° C.) and polyvinylidene fluoride (operating temperature range: up to 130° C.) which have been used for the pipes.

Patent Literature 1 discloses as a material suitable for riser pipes a fluororesin which is a copolymer containing copolymerized units of tetrafluoroethylene, vinylidene fluoride, and an ethylenically unsaturated monomer excluding tetrafluoroethylene and vinylidene fluoride, and has a specific storage elastic modulus.

CITATION LIST

Patent Literature

Patent Literature 1: WO 2010/110129

SUMMARY OF INVENTION

Technical Problem

Pipes for pumping from oil fields and resins for hydrogen tanks used in a high-temperature and high-pressure environment are desired to have not only low permeability but also an ability to prevent defects such as blistering and cracking due to expansion of gas dissolved in the resin when the pipes and the resins are rapidly decompressed from a high pressure state.

In view of the above state of the art, the invention aims to provide a fluororesin that is less likely to suffer blistering and cracking even when rapidly decompressed from a very high-temperature and very high-pressure state.

Solution to Problem

The invention relates to a fluororesin containing a vinylidene fluoride unit and a tetrafluoroethylene unit, the fluororesin having a gas chromatography-mass spectrometry total ion chromatogram including a peak which is assigned to a component having a molecular weight of 202 to 903 and which has a peak intensity of 1000 or lower.

In the fluororesin of the invention, preferably, the vinylidene fluoride unit represents 10.0 to 70.0 mol % of all monomer units constituting the fluororesin, and the tetrafluoroethylene unit represents 30.0 to 85.0 mol % of all monomer units constituting the fluororesin.

Preferably, the fluororesin of the invention further contains an ethylenically unsaturated monomer unit of at least one ethylenically unsaturated monomer selected from the group consisting of ethylenically unsaturated monomers represented by the following formula (1):

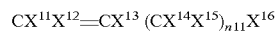

wherein $X^{11}$ to $X^{16}$ are the same as or different from each other, and are each H, F, or Cl; and $n^{11}$ is an integer of 0 to 8, excluding tetrafluoroethylene and vinylidene fluoride; and ethylenically unsaturated monomers represented by the following formula (2):

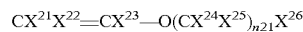

wherein $X^{21}$ to $X^{26}$ are the same as or different from each other, and are each H, F, or Cl; and $n^{21}$ is an integer of 0 to 8, wherein the vinylidene fluoride unit represents 10.0 to 49.9 mol % of all monomer units constituting the fluororesin, the tetrafluoroethylene unit represents 50.0 to 85.0 mol % of all monomer units constituting the fluororesin, and the ethylenically unsaturated monomer unit represents 0.1 to 5.0 mol % of all monomer units constituting the fluororesin.

The invention also relates to a molded article containing the aforementioned fluororesin.

Advantageous Effects of Invention

The fluororesin of the invention has the aforementioned structure, and thus is less likely to suffer blistering and cracking even when rapidly decompressed from a very high-temperature and high-pressure state.

The molded article of the invention has the aforementioned structure, and thus is less likely to suffer blistering and cracking even when rapidly decompressed from a very high-temperature and high-pressure state.

DESCRIPTION OF EMBODIMENTS

The invention will be specifically described hereinbelow.

The fluororesin of the invention has a gas chromatography-mass spectrometry total ion chromatogram including a peak which is assigned to a component having a molecular weight of 202 to 903 and which has a peak intensity of 1000 or lower. The peak intensity may have any lower limit. No peak assigned to a component having a molecular weight of 202 to 903 may be observed. In other words, the lower limit may be 0.

The component having a molecular weight of 202 to 903 is presumed to include oligomers represented by $H(CF_2)_nH$ (wherein n is an integer of 4 to 18). Such oligomers are presumably generated by decomposition of polymers in melt extrusion during pelletization. The fluororesin of the invention hardly contains a component having a molecular weight of 202 to 903, and thus is less likely to suffer blistering and cracking even when rapidly decompressed from a high-temperature and high-pressure state.

In the case where multiple peaks assigned to components each having a molecular weight of 202 to 903 are observed in the total ion chromatogram in the invention, all the intensities thereof are 1000 or lower. The "peak intensity" means the height of the peak. The total ion chromatogram is obtainable by plotting the retention time on the horizontal axis and the intensity (the sum of the ions) on the vertical axis. In the analysis under the following conditions, the peak assigned to a component having a molecular weight of 202 to 903 appears at the timing of about 5.4 to 18.0 minutes.

The analysis by gas chromatography-mass spectrometry in the description is performed under the following conditions.
1) Device used
   Agilent 5977A (Agilent Technologies, Inc.)
2) Sample preparation conditions
   Fluororesin is molded into pellets having a diameter of 2.5 mm and a length of 2.5 mm, and a 0.50-g portion of the fluororesin was put into a 6.0-mL vial. The vial was sealed hermetically and heated at 200° C. for 30 minutes.
The gas phase was immediately collected in a 2.0-mL syringe.
3) Gas chromatography conditions
   Column: DB-624 (Agilent Technologies Inc.)
   Column length: 60 m, inner diameter: 320 μm, thickness: 1.8 μm
   Inlet temperature: 250° C.
   Gas used: helium
   Flow rate: 1.4 mL/min
   Oven temperature: initially 50° C. and maintained for five minutes, then increased up to 250° C. at 10° C./min and maintained for five minutes to the end
4) Mass spectrometry conditions
   Mass spectrometry: scanning with m/z=10 to 600
   Ionization: EI
   Relative intensity: calculated on the basis of peak heights in MS chromatogram with m/z=51

The fluororesin of the invention contains a vinylidene fluoride unit and a tetrafluoroethylene unit. The fluororesin may contain another monomer unit as long as it contains a vinylidene fluoride unit and a tetrafluoroethylene unit.

In the fluororesin, preferably, the vinylidene fluoride unit represents 10.0 to 70.0 mol % of all monomer units constituting the fluororesin and the tetrafluoroethylene unit represents 30.0 to 85.0 mol % of all monomer units constituting the fluororesin. More preferably, the vinylidene fluoride unit represents 15.0 to 70.0 mol % of all monomer units constituting the fluororesin and the tetrafluoroethylene unit represents 30.0 to 85.0 mol % of all monomer units constituting the fluororesin. Still more preferably, the vinylidene fluoride unit represents 15.0 to 60.0 mol % of all monomer units constituting the fluororesin and the tetrafluoroethylene unit represents 40.0 to 85.0 mol % of all monomer units constituting the fluororesin.

The fluororesin preferably further contains an ethylenically unsaturated monomer unit of at least one ethylenically unsaturated monomer selected from the group consisting of ethylenically unsaturated monomers represented by the following formula (1) and ethylenically unsaturated monomers represented by the following formula (2).

Formula (1) is as follows:

$$CX^{11}X^{12}=CX^{13}(CX^{14}X^{15})_{n11}X^{16}$$

wherein $X^{11}$ to $X^{16}$ are the same as or different from each other, and are each H, F, or Cl; and $n^{11}$ is an integer of 0 to 8. The ethylenically unsaturated monomers represented by the following formula (1) exclude tetrafluoroethylene and vinylidene fluoride.

Formula (2) is as follows:

$$CX^{21}X^{22}=CX^{23}-O(CX^{24}X^{25})_{n21}X^{26}$$

wherein $X^{21}$ to $X^{26}$ are the same as or different from each other, and are each H, F, or Cl; and $n^{21}$ is an integer of 0 to 8.

Preferred among the ethylenically unsaturated monomers represented by the formula (1) is at least one selected from the group consisting of $CF_2=CFCl$, $CF_2=CFCF_3$, those represented by the following formula (3):

$$CH_2=CF-(CF_2)_{n11}X^{16}$$

(wherein $X^{16}$ and $n^{11}$ are defined as mentioned above), and those represented by the following formula (4):

$$CH_2=CH-(CF_2)_{n11}X^{16}$$

(wherein $X^{16}$ and $n^{11}$ are defined as mentioned above);
more preferred is at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$, and $CF_2=CFCF_3$; and still more preferred is at least one selected from the group consisting of $CF_2=CFCl$, $CH_2=CH-C_6F_{13}$, $CH_2=CF-C_3F_6H$, and $CH_2=CFCF_3$.

Preferred among the ethylenically unsaturated monomers represented by the formula (2) is at least one selected from the group consisting of $CF_2=CF-OCF_3$, $CF_2=CF-OCF_2CF_3$, and $CF_2=CF-OCF_2CF_2CF_3$.

In the fluororesin further containing the ethylenically unsaturated monomer, preferably, the vinylidene fluoride unit represents 10.0 to 49.9 mol % of all monomer units constituting the fluororesin, the tetrafluoroethylene unit represents 50.0 to 85.0 mol % of all monomer units constituting the fluororesin, and the ethylenically unsaturated monomer unit represents 0.1 to 5.0 mol % of all monomer units constituting the fluororesin. More preferably, the vinylidene fluoride unit represents 25.0 to 49.9 mol % of all monomer units constituting the fluororesin, the tetrafluoroethylene unit represents 50.0 to 70.0 mol % of all monomer units constituting the fluororesin, and the ethylenically unsaturated monomer unit represents 0.1 to 5.0 mol % of all monomer units constituting the fluororesin.

The fluororesin of the invention is preferably a copolymer containing:
  55.0 to 90.0 mol % of a copolymerized unit of tetrafluoroethylene;
  5.0 to 44.9 mol % of a copolymerized unit of vinylidene fluoride; and
  0.1 to 10.0 mol % of a copolymerized unit of an ethylenically unsaturated monomer represented by the formula (1).

The fluororesin of the invention is more preferably a copolymer containing:
  55.0 to 85.0 mol % of a copolymerized unit of tetrafluoroethylene;
  10.0 to 44.9 mol % of a copolymerized unit of vinylidene fluoride; and
  0.1 to 5.0 mol % of a copolymerized unit of an ethylenically unsaturated monomer represented by the formula (1).

The fluororesin of the invention is still more preferably a copolymer containing:
55.0 to 85.0 mol % of a copolymerized unit of tetrafluoroethylene;
13.0 to 44.9 mol % of a copolymerized unit of vinylidene fluoride; and
0.1 to 2.0 mol % of a copolymerized unit of an ethylenically unsaturated monomer represented by the formula (1).

In order not only to improve the mechanical strength of the fluororesin at high temperatures but also to give particularly excellently low permeability of the fluororesin, the ethylenically unsaturated monomer represented by the formula (1) is preferably at least one monomer selected from the group consisting of $CH_2=CH-C_4F_9$, $CH_2=CH-C_6F_{13}$, and $CH_2=CF-C_3F_6H$. More preferably, the ethylenically unsaturated monomer represented by the formula (1) is at least one monomer selected from the group consisting of $CH_2=CH-C_4F_9$, $CH_2=CH-C_6F_{13}$, and $CH_2=CF-C_3F_6H$ and the fluororesin is a copolymer containing:
55.0 to 80.0 mol % of a copolymerized unit of tetrafluoroethylene;
19.5 to 44.9 mol % of a copolymerized unit of vinylidene fluoride; and
0.1 to 0.6 mol % of a copolymerized unit of an ethylenically unsaturated monomer represented by the formula (1).

The fluororesin of the invention may also be a copolymer containing:
58.0 to 85.0 mol % of a copolymerized unit of tetrafluoroethylene;
10.0 to 41.9 mol % of a copolymerized unit of vinylidene fluoride; and
0.1 to 5.0 mol % of a copolymerized unit of an ethylenically unsaturated monomer represented by the formula (1).

The fluororesin of the invention is also preferably a copolymer containing:
55.0 to 90.0 mol % of a copolymerized unit of tetrafluoroethylene;
9.2 to 44.2 mol % of a copolymerized unit of vinylidene fluoride; and
0.1 to 0.8 mol % of a copolymerized unit of an ethylenically unsaturated monomer represented by the formula (2).

The fluororesin of the invention is more preferably a copolymer containing:
58.0 to 85.0 mol % of a copolymerized unit of tetrafluoroethylene;
14.5 to 41.5 mol % of a copolymerized unit of vinylidene fluoride; and
0.1 to 0.5 mol % of a copolymerized unit of an ethylenically unsaturated monomer represented by the formula (2).

The fluororesin of the invention is also preferably a copolymer containing:
55.0 to 90.0 mol % of a copolymerized unit of tetrafluoroethylene;
5.0 to 44.8 mol % of a copolymerized unit of vinylidene fluoride;
0.1 to 10.0 mol % of a copolymerized unit of an ethylenically unsaturated monomer represented by the formula (1); and
0.1 to 0.8 mol % of a copolymerized unit of an ethylenically unsaturated monomer represented by the formula (2).

The fluororesin of the invention is more preferably a copolymer containing:
55.0 to 85.0 mol % of a copolymerized unit of tetrafluoroethylene;
9.5 to 44.8 mol % of a copolymerized unit of vinylidene fluoride;
0.1 to 5.0 mol % of a copolymerized unit of an ethylenically unsaturated monomer represented by the formula (1); and
0.1 to 0.5 mol % of a copolymerized unit of an ethylenically unsaturated monomer represented by the formula (2).

The fluororesin of the invention is still more preferably a copolymer containing:
55.0 to 80.0 mol % of a copolymerized unit of tetrafluoroethylene;
19.8 to 44.8 mol % of a copolymerized unit of vinylidene fluoride;
0.1 to 2.0 mol % of a copolymerized unit of an ethylenically unsaturated monomer represented by the formula (1); and
0.1 to 0.3 mol % of a copolymerized unit of an ethylenically unsaturated monomer represented by the formula (2). The fluororesin of the invention having this composition can exhibit particularly excellently low permeability.

The fluororesin of the invention may also be a copolymer containing:
58.0 to 85.0 mol % of a copolymerized unit of tetrafluoroethylene;
9.5 to 39.8 mol % of a copolymerized unit of vinylidene fluoride;
0.1 to 5.0 mol % of a copolymerized unit of an ethylenically unsaturated monomer represented by the formula (1); and
0.1 to 0.5 mol % of a copolymerized unit of an ethylenically unsaturated monomer represented by the formula (2).

The fluororesin of the invention in which the amounts of the monomers fall within the above respective ranges has higher crystallinity and a higher storage elastic modulus even at 170° C. than conventionally known copolymers containing tetrafluoroethylene, vinylidene fluoride, and a third component. Thus, this fluororesin has excellent mechanical strength, chemical resistance, and low permeability, at high temperatures. The low permeability at high temperatures herein means the low permeability against fluids such as methane, hydrogen sulfide, $CO_2$, methanol, and hydrochloric acid.

The amounts of the respective monomers of the copolymer can be calculated as the amounts of the monomer units by appropriate combination of NMR and elemental analysis in accordance with the types of the monomers.

The fluororesin of the invention preferably has a melt flow rate (MFR) of 0.1 to 100 g/10 min, more preferably 0.1 to 50 g/10 min, still more preferably 0.1 to 10 g/10 min.

The MFR refers to the mass (g/10 min) of a polymer that flows out of a nozzle having an inner diameter of 2 mm and a length of 8 mm per 10 minutes at 297° C. under a load of 5 kg using a melt indexer (Toyo Seiki Seisaku-sho, Ltd.) in conformity with ASTM D3307-01.

The fluororesin of the invention preferably has a melting point of 180° C. or higher, and the upper limit thereof may be 290° C. The lower and upper limits thereof are more preferably 200° C. and 270° C., respectively.

The melting point refers to the temperature corresponding to the peak on an endothermic curve obtained by thermal analysis at a temperature-increasing rate of 10° C./min using a differential scanning calorimeter RDC220 (Seiko Instruments Inc.) in conformity with ASTM D-4591.

The fluororesin of the invention preferably has a pyrolysis starting temperature (1% mass reduction temperature) of 360° C. or higher. The lower limit thereof is more preferably 370° C. The upper limit of the pyrolysis starting temperature may be 430° C., for example, as long as it falls within the above range.

The pyrolysis starting temperature refers to the temperature at which 1% by mass of a fluororesin subjected to a heating test is decomposed, and is a value obtainable by measuring the temperature at which the mass of the fluororesin subjected to the heating test is reduced by 1% by mass using a thermogravimetric/differential thermal analyzer (TG-DTA).

The fluororesin of the invention preferably has a storage elastic modulus (E') of 60 to 400 MPa measured at 170° C. by dynamic viscoelasticity analysis. Too low a storage elastic modulus at high temperatures may cause a rapid decrease in mechanical strength, possibly resulting in deformation. Too high a storage elastic modulus may cause too hard a resin which may possibly be difficult to mold.

The storage elastic modulus is a value determined at 170° C. by dynamic viscoelasticity analysis. Specifically, the storage elastic modulus is a value determined on a sample having a length of 30 mm, width of 5 mm, and thickness of 0.25 mm using a dynamic viscoelasticity analyzer DVA220 available from IT Keisoku Seigyo Co., Ltd. in a tensile mode at a clamp width of 20 mm, a measurement temperature of 25° C. to 250° C., a temperature-increasing rate of 2° C./rain, and a frequency of 1 Hz. The storage elastic modulus (E') at 170° C. is preferably 80 to 350 MPa, more preferably 100 to 350 MPa.

The measurement sample may be prepared by setting the molding temperature to a temperature higher than the melting point of the fluororesin by 50° C. to 100° C., molding the material into a film having a thickness of 0.25 mm under a pressure of 3 MPa, and cutting the film into a size of 30 mm in length and 5 mm in width, for example.

In order to achieve excellent $CO_2$ barrier performance in a high-temperature environment, the fluororesin of the invention preferably has a $CO_2$ (carbon dioxide) permeability coefficient $P(CO_2)$ of $20 \times 10^{-9}$ cm$^3$·cm/cm$^2$·s·cmHg or lower at 150° C. The permeability coefficient $P(CO_2)$ is more preferably $15 \times 10^{-9}$ cm$^3$·cm/cm$^2$·s·cmHg or lower, still more preferably $13 \times 10^{-9}$ cm$^3$·cm/cm$^2$·s·cmHg or lower.

In order to achieve excellent $CH_4$ barrier performance in a high-temperature environment, the fluororesin of the invention preferably has a $CH_4$ (methane) permeability coefficient $P(CH_4)$ of $10 \times 10^{-9}$ cm$^3$·cm/cm$^2$·s·cmHg or lower at 150° C. The permeability coefficient $P(CH_4)$ is more preferably $5 \times 10^{-9}$ cm$^3$·cm/cm$^2$·s·cmHg or lower, still more preferably $3 \times 10^{-9}$ cm$^3$·cm/cm$^2$·s·cmHg or lower.

In order to achieve excellent blistering resistance in a high-temperature and high-pressure environment even with a large thickness, the fluororesin of the invention preferably has a ratio $D(CO_2)/S(CO_2)$ between a diffusion coefficient $D(CO_2)$ and a solubility coefficient $S(CO_2)$ of $CO_2$ of $3 \times 10^{-5}$ Pa·m$^2$/s or higher, more preferably $5 \times 10^{-5}$ Pa·m$^2$/s or higher, still more preferably $10 \times 10^{-5}$ Pa·m$^2$/s or higher, at 150° C.

In order to achieve excellent blistering resistance in a high-temperature and high-pressure environment even with a large thickness, the fluororesin of the invention preferably has a ratio $D(CH_4)/S(CH_4)$ between a diffusion coefficient $D(CH_4)$ and a solubility coefficient $S(CH_4)$ of $CH_4$ of $40 \times 10^{-5}$ Pa·m$^2$/s or higher, more preferably $45 \times 10^{-5}$ Pa·m$^2$/s or higher, still more preferably $50 \times 10^{-5}$ Pa·m$^2$/s or higher, at 150° C.

The permeability coefficients $P(CO_2)$ and $P(CH_4)$, the diffusion coefficients $D(CO_2)$ and $D(CH_4)$, and the solubility coefficients $S(CO_2)$ and $S(CH_4)$ can be determined by photoacoustic detection. Specifically, these parameters can be determined by photoacoustic detection using WaSul-Perm system (Hilase) with $N_2$ flow on the detection side and the corresponding test gas flow on the test gas side.

The fluororesin of the invention preferably contains a —$CONH_2$ group at a main chain end. The presence of a —$CONH_2$ group at a main chain end leads to a peak assigned to the N—H bonds in the —$CONH_2$ group at an absorption wavelength of 3400 to 3460 cm$^{-1}$ ($v_{N-H}$) in an infrared absorption spectrum of the fluororesin obtained by infrared absorption spectrum analysis. The presence of this peak can confirm the presence of the —$CONH_2$ group at a main chain end. The —$CONH_2$ group is a thermally stable end group.

The fluororesin preferably contains 20 or more —$CONH_2$ groups at a main chain end per $10^6$ main chain carbon atoms. The number of —$CONH_2$ groups is more preferably 30 or more. The upper limit thereof may be 500 or less, or may be 250 or less, although it is not limited thereto.

The number of —$CONH_2$ groups is calculated as follows. A 200-μm-thick film is subjected to infrared absorption spectrum analysis and, in the resulting infrared absorption spectrum, the absorbance of the peak present at 2900 to 3100 cm$^{-1}$ assigned to the $CH_2$ groups in the main chain is standardized to 1.0. The absorbance A of the peak assigned to the N—H bonds in the $NH_2$ end groups present around 3400 to 3470 cm$^{-1}$ in this spectrum is then determined, and the number of the target groups is calculated by the following formula.

$$\text{Number of —CONH}_2 \text{ groups per } 10^6 \text{ carbon atoms} \\ \text{in main chain} = 4258 \times A$$

The fluororesin preferably has an amide group (—$CONH_2$ group) index of 0.005 to 0.050, more preferably 0.010 to 0.045, still more preferably 0.015 to 0.040.

The amide group (—$CONH_2$ group) index of the fluororesin can be determined by the following method. Fragments of each powder (or pellets) of the fluororesin are compression molded at room temperature to provide a film having a thickness of 200 μm (±5 μm). Each of the resulting films is subjected to infrared absorption spectrum analysis. In the analysis, the film is scanned 128 times using Perkin-Elmer Spectrum Ver. 3.0 and the resulting IR spectrum is analyzed, so that the peak absorbance is determined. The thickness of the film is measured using a micrometer. The absorbance of the peak present at 2900 to 3100 cm$^{-1}$ assigned to the $CH_2$ groups in the main chain in the infrared absorption spectrum is standardized to 1.0. The height of the peak assigned to the N—H bonds in the amide groups (—$CONH_2$) present around 3400 to 3470 cm$^{-1}$ in the standardized spectrum is defined as the amide group index.

The fluororesin preferably has a carbonate group index (ROCOO group index) of 0.000 to 0.050. The carbonate group index is more preferably 0.000 to 0.030. The carbonate group index is still more preferably 0.000 to 0.020.

The carbonate group (ROCOO group) index of the fluororesin can be determined by the following method. Fragments of each powder (or pellets) of the fluororesin are compression molded at room temperature to provide a film having a thickness of 200 μm (±5 μm). Each of the resulting films is subjected to infrared absorption spectrum analysis. In the analysis, the film is scanned 128 times using Perkin-Elmer Spectrum Ver. 3.0 and the resulting IR spectrum is analyzed, so that the peak absorbance is determined. The thickness of the film is measured using a micrometer. The absorbance of the peak present at 2900 to 3100 cm$^{-1}$ assigned to the $CH_2$ groups in the main chain in the infrared absorption spectrum is standardized to 1.0. The height of the peak assigned to the 0-0 bonds in the carbonate groups (ROCOO groups) present around 1780 to 1830 cm$^{-1}$ in the standardized spectrum is defined as the carbonate group index.

The fluororesin preferably contains 0 to 40 unstable end groups at a main chain end per 10$^6$ main chain carbon atoms. The number of unstable end groups is more preferably 0 to 20, still more preferably 0.

The unstable end groups may include at least one selected from the group consisting of a —COF group, a —COOH group, a —COOCH$_3$ group, a —CF=CF$_2$ group, a —OH group, and a ROCOO— group. R in the ROCOO— group is preferably a linear or branched alkyl group, and this alkyl group may contain 1 to 15 carbon atoms.

The number of unstable end groups is calculated as follows. A 200-μm-thick film is subjected to infrared spectrum analysis and, in the resulting infrared absorption spectrum, the absorbance of the peak present at 2900 to 3100 cm$^{-1}$ assigned to the CH$_2$ groups in the main chain is standardized to 1.0. The absorbance A of the peak assigned to the unstable end groups present in this spectrum is then determined, and the number of the target groups is calculated by the following formula. The coefficients K are as shown in Table 1.

Number of unstable end groups per 10$^6$ carbon atoms in main chain=K×A

TABLE 1

| Unstable end group | Position of absorption wavelength of peak (cm$^{-1}$) | Coefficient K |
| --- | --- | --- |
| COF group | 1850 to 1910 | 3584 |
| COOH group | 1750 to 1850 | 4057 |
| COOCH$_3$ group | 1770 to 1810 | 3162 |
| CFCF$_2$ group | 1770 to 1810 | 3386 |
| OH group | 3610 to 3660 | 20677 |
| ROCOO group | 1780 to 1830 | 1265 |

The fluororesin of the invention may be produced by a production method including, for example, polymerizing vinylidene fluoride and tetrafluoroethylene in the presence of a polymerization initiator to provide a polymer; amidating the polymer; and bringing the polymer into contact with a supercritical fluid. This method enables better removal of a component having a molecular weight of 202 to 903 than methods consisting of amidation or heat-deaeration.

The amidation can be achieved by bringing the polymer obtained by the polymerization into contact with a nitrogen compound that can generate ammonia water, ammonia gas, or ammonia. The amidation provides —CONH$_2$ groups at a polymer main chain end.

Contact between the polymer and ammonia water may be achieved by adding ammonia water to the polymer obtained by the polymerization. The ammonia water may have an ammonia concentration of 0.01 to 28% by mass, and the contact time may be 1 minute to 24 hours. The number of —CONH$_2$ groups can be controlled by adjusting the concentration of and the contact time with ammonia water.

Contact between the polymer and ammonia gas may be achieved by, for example, putting the polymer into a reaction container and introducing ammonia gas into the reaction container. Ammonia gas may be mixed with a gas not reactive in the amidation before introduced into the reaction container.

Examples of the gas not reactive in the amidation include, but are not limited to, nitrogen gas, argon gas, and helium gas. The ammonia gas preferably represents 1% by mass or more, more preferably 10% by mass or more, of the gas mixture. The proportion of the ammonia gas may be 80% by mass or less as long as it falls within the above range.

The amidation is preferably performed at 0° C. or higher and 100° C. or lower, more preferably 5° C. or higher, still more preferably 10° C. or higher, while more preferably 90° C. or lower, still more preferably 80° C. or lower. Too high an amidation temperature may cause decomposition of the polymer or other components, or may cause fusion of them. Too low an amidation temperature may cause long processing time, which is not preferred in terms of productivity.

The amidation time is typically 1 minute to 24 hours, although it is in accordance with the amount of the polymer.

The polymerization of vinylidene fluoride and tetrafluoroethylene may be performed by solution polymerization, bulk polymerization, emulsion polymerization, or suspension polymerization, for example. In order to industrially facilitate the polymerization, emulsion polymerization or suspension polymerization is preferred, and suspension polymerization is more preferred.

The polymerization initiator may be an oil-soluble radical polymerization initiator or a water-soluble radical initiator.

The oil-soluble radical polymerization initiator may be a known oil-soluble peroxide. Typical examples thereof include dialkyl peroxycarbonates such as diisopropyl peroxydicarbonate, di-n-propyl peroxydicarbonate, and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, w-hydro-dodecafluoroheptanoyl-ω-hydro-hexadecafluorononanoyl-peroxide, ω-chloro-hexafluorobutyryl-ω-chloro-decafluorohexanoyl-peroxide, ω-hydro-dodecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. A reducing agent such as a sulfite or a sulfurous acid salt may be used in combination with a peroxide, and the amount thereof may be 0.1 to 20 times the amount of the peroxide.

The polymerization initiator is preferably a dialkyl peroxycarbonate, and more preferably at least one selected from the group consisting of diisopropyl peroxydicarbonate, di-n-propyl peroxydicarbonate, and di-sec-butyl peroxydicarbonate.

In the polymerization, a surfactant, a chain-transfer agent, and a solvent may be used. Each of these additives may be conventionally known one.

The surfactant may be a known surfactant, and examples thereof include nonionic surfactants, anionic surfactants, and cationic surfactants. Preferred are fluorine-containing anionic surfactants, and more preferred are C4-C20 linear or branched fluorine-containing anionic surfactants optionally containing an ether-bond oxygen (in other words, an oxygen atom may be present between carbon atoms). The amount thereof (relative to the water as a polymerization medium) is preferably 50 to 5000 ppm.

Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is usually 0.01 to 20% by mass relative to the polymerization solvent.

Examples of the solvent include water and solvent mixtures of water and an alcohol.

In the suspension polymerization, a fluorosolvent may be used in addition to water. Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$. Perfluoroalkanes are preferred. In consideration of the suspension performance and economic efficiency, the amount of the fluorosolvent is preferably 10 to 100% by mass relative to the aqueous medium.

The water used for the polymerization solvent is preferably deionized water, and the electric conductivity thereof is preferably 10 μS/cm or lower and as low as possible. Too high an ion content may cause an unstable reaction rate. The fluorosolvent also preferably has a high purity and contains minimum amounts of compounds which contain acids or chlorine groups and which are introduced during the production processes. Such compounds containing acid contents or chlorine may cause chain transfer, and thus minimization of these compounds is preferred to stabilize the polymerization rate and the molecular weight. It is also preferred that the other materials used in the polymerization (e.g., monomers such as vinylidene fluoride and tetrafluoroethylene, an initiator, and a chain-transfer agent) are those having a purity of 100% and containing no chain-transferable components. In order to stabilize the reaction rate and to control the molecular weight, a preparatory step for the reaction is preferably performed as follows: putting water into a vessel; performing an airtightness test while stirring the contents inside the vessel; reducing the pressure inside the vessel, slightly increasing the pressure with nitrogen, and reducing the pressure again in a repetitive manner; reducing the oxygen concentration in the vessel to the minimum value which is 1000 ppm or less and confirming this reduction; reducing the pressure again; and then putting the materials such as a fluorosolvent and monomers into the vessel to start the reaction.

In a step of recovering the remaining monomers after the reaction, the remaining monomers may polymerize to generate a low molecular weight product. Such generation of a low molecular weight product may cause generation of smoke and die buildup during molding, and poor heat resistance of a molded article. In order to inhibit these problems, the temperature during the recovery is preferably decreased as low as possible so as to reduce the activity of the remaining initiator. Alternatively, putting hydroquinone or cyclohexane is also effective in stopping the reaction of the remaining monomers.

The polymerization temperature may be any temperature, and may be 0° C. to 100° C. The polymerization pressure is appropriately determined in accordance with other polymerization conditions such as the type, amount, and vapor pressure of a solvent used, and the polymerization temperature. It may usually be 0 to 9.8 MPaG.

In the above production method, the polymer is brought into contact with a supercritical fluid. The polymer may be an amidated polymer. This step extracts a component having a molecular weight of 202 to 903 contained in the polymer.

The "supercritical fluid" means a fluid under a condition at which the temperature T and the pressure P excess the respective critical points (both the critical temperature (Tc) and the critical pressure (Pc)) (a region where T>Tc and P>Pc in the P-T chart).

In order to smoothly progress the extraction of a component having the specific molecular weight, the supercritical fluid is preferably a supercritical fluid of inert gas, more preferably a supercritical fluid of nitrogen, argon, or carbon dioxide, still more preferably a supercritical fluid of carbon dioxide.

The inert gas is in the form of gas at standard ambient temperature and pressure and turns into a supercritical fluid under some temperature and pressure conditions. For example, the supercritical fluid of carbon dioxide is carbon dioxide under conditions including a temperature Tc of higher than about 31.1° C. and a pressure Pc of higher than about 7.38 MPa. The supercritical fluid of nitrogen is nitrogen under conditions including a temperature Tc of higher than about −147° C. and a pressure Pc of higher than about 3.4 MPa. The supercritical fluid of argon is argon under conditions including a temperature Tc of higher than about −122° C. and a pressure Pc of higher than about 4.9 MPa.

The temperature of the supercritical fluid may be any temperature exceeding the critical temperature (Tc). In order to very smoothly progress the extraction of a component having the specific molecular weight, the temperature is preferably 60° C. to 200° C., more preferably 100° C. to 200° C., still more preferably 120° C. to 180° C., most preferably 130° C. to 160° C.

The pressure of the supercritical fluid may be any pressure exceeding the critical pressure (Pc). In order to very smoothly progress the extraction of a component having the specific molecular weight, the pressure is preferably 40 to 200 MPa, more preferably 60 to 200 MPa, still more preferably 90 to 170 MPa, most preferably 100 to 150 MPa.

The retention time of the supercritical fluid is, although not limited to, preferably 0.1 to 1000 hours, more preferably 1 to 500 hours, still more preferably 3 to 200 hours, most preferably 24 to 120 hours.

The supercritical fluid is preferably used in an amount 10 times or more, more preferably 15 to 200 times larger than the mass of the polymer.

The above contact may be accompanied by the use of an entrainer such as a hydrocarbon solvent or a fluorine-containing solvent. Examples of the hydrocarbon solvent include alcohols such as ethanol, ethanol, propanol, and butanol, ethers such as dimethyl ether, and hexane. The entrainer is preferably used in an amount of 1 to 20% by mass, more preferably 1 to 5% by mass of the supercritical fluid.

The contact of the polymer and the supercritical fluid may be performed by, for example, putting the polymer into a container, heating the polymer up to a predetermined temperature using a heating means such as a heater, supplying the inert gas into the container to increase the pressure in the container up to a predetermined pressure, and maintaining the predetermined temperature and pressure for an appropriate period of time. The heating and the pressure increase may be achieved in any order.

The polymer to be brought into contact with the supercritical fluid may be in any form such as powder, beads, or pellets. The polymer is preferably in the form of pellets.

The production method may include separating the polymer and the supercritical fluid. In the case of performing the contact in the container, the polymer and the supercritical fluid may be separated and the fluororesin of the invention may be collected by discharging the supercritical fluid from the container.

The production method may include washing and drying the amidated polymer. This step may be performed after amidating the polymer and before bringing the polymer into contact with the supercritical fluid. The washing and drying can be performed by known methods.

The production method may include melt-extruding the polymer to provide pellets. This step may be performed after washing and drying the polymer and before bringing the polymer into contact with the supercritical fluid. The pelletization by melt extrusion may be performed as appropriate at a temperature falling within the range of 200° C. to 370° C.

The production method may include heat-deaerating the pellets. This step may be performed before bringing the polymer into contact with the supercritical fluid.

The heat-deaeration temperature preferably falls within the range of 150° C. or higher to 250° C. or lower. It more preferably falls within the range of 160° C. or higher to 220° C. or lower. It still more preferably falls within the range of 170° C. or higher to 200° C. or lower. The heat-deaeration time is preferably 3 hours or longer and 50 hours or shorter. It is more preferably 5 hours or longer and 20 hours or shorter. It still more preferably falls within the range of 6 hours or longer to 15 hours or shorter.

The heat deaeration may be performed with any equipment, and examples are the following: a system in which pellets are put into a stainless-steel vat and this vat is placed in a hot-blast electric furnace; a system in which the bottom of a vat supports a mesh with holes through which pellets do not pass to fall; a system in which a vat is covered with a stainless-steel mesh; and a system in which pellets are put into a heat-resistant cylindrical container made of, for example, stainless steel and hot blasts with controlled temperatures are passed above and below the vat to maintain the inside temperature. Removal efficiency may be increased by changing the temperature of the heated pellets. An example of this is a method in which the pellets heated once is again molten so that the pelletization and the heating are repeated.

An example of a particularly preferred method for producing the fluororesin of the invention is a production method including: polymerizing vinylidene fluoride and tetrafluoroethylene in the presence of a polymerization initiator to provide a polymer; amidating the polymer obtained by the polymerization; washing and drying the amidated polymer; melt-extruding the dried polymer to provide pellets; bringing the resulting pellets into contact with a supercritical fluid; and separating the pellets and the supercritical fluid.

A composition containing the aforementioned fluororesin and a component having a molecular weight of 202 to 903 and having a gas chromatography-mass spectrometry chromatogram that is obtained by determining the mass spectrum of the composition in which the peak assigned to the component having a molecular weight of 202 to 903 has a peak intensity of 1000 or lower can also have an effect of reducing blistering and cracking even when rapidly decompressed from a high-temperature and high-pressure state.

The composition satisfies that the peak assigned to a component having a molecular weight of 202 to 903 has a peak intensity of 1000 or lower. Thus, the composition includes a composition providing no such a peak. In other words, the composition may contain no component having a molecular weight of 202 to 903, and the peak intensity may be 0 to 1000.

The fluororesin and the composition may be in any form, such as an aqueous dispersion, powder, beads, or pellets. It is preferably in the form of pellets.

The fluororesin of the invention can be molded into a variety of molded articles, and the resulting molded article has excellent characteristics such as mechanical strength and chemical resistance at high temperatures and low permeability at high temperatures. The molded article is less likely to suffer blistering and cracking even when rapidly decompressed from a high-temperature and high-pressure state.

The molded article may have any shape, such as a hose, a pipe, a tube, a sheet, a seal, a gasket, a packing, a film, a tank, a roller, a bottle, or a container. The molded article formed from the fluororesin of the invention is particularly preferably a pipe. The pipe is less likely to suffer blistering and cracking even when rapidly decompressed from a high-temperature and high-pressure state.

The fluororesin may be molded by any technique, and examples of the molding technique include compression molding, extrusion molding, transfer molding, injection molding, rotational molding, rotational lining, and electrostatic coating. Molding of the fluororesin of the invention into a pipe is preferably achieved by extrusion molding. The molding temperature is preferably 200° C. to 350° C.

The fluororesin of the invention may be mixed, before molding, with any of components such as fillers, plasticizers, processing aids, release agents, pigments, flame retardants, lubricants, photostabilizers, weather-resistance stabilizers, conductive agents, antistatics, ultraviolet absorbers, antioxidants, blowing agents, flavors, oils, softening agents, and dehydrofluorinating agents. Examples of the fillers include polytetrafluoroethylene, mica, silica, talc, Celite, clay, titanium oxide, and barium sulfate. An example of the conductive agents is carbon black. Examples of the plasticizers include dioctyl phthalate and pentaerythritol. Examples of the processing aids include carnauba wax, sulfone compounds, low molecular weight polyethylene, and fluorine-based aids. Examples of the dehydrofluorinating agents include organic onium compounds and amidines.

The fluororesin of the invention can suitably be used for pipes for transporting materials from the sea floor to the surface of the sea in an offshore oil field or a gas field. Examples of pipes used for offshore oil fields include risers (pipes for pumping up crude oil), umbilicals (integration of pipes for supplying chemicals for crude oil viscosity reduction for the purpose of controlling the pumping, power cables, and others), flowlines (pipes for transporting pumped crude oil which extend on the sea floor), and the like. For the structures thereof, metallic pipes and metal/resin hybrid pipes are known. The fluororesin of the invention can suitably be used for any of these pipes. Examples of the materials passing through pipes include fluids such as crude oil, petroleum gas, and natural gas.

The fluororesin of the invention can also suitably be used as an innermost or outermost coating or lining material for metal pipes for transporting fluids such as crude oil and natural gas whether in the ground, on the ground, or on the sea floor, for example. The purpose of coating or lining the innermost layer is to block carbon dioxide and hydrogen sulfide which are contained in crude oil and natural gas and cause corrosion of metal pipes to inhibit corrosion of metal pipes or to reduce the fluid friction due to highly viscous crude oil. The purpose of coating or lining the outermost layer is also to inhibit corrosion due to seawater or acidic water. In order to further improve the rigidity and strength of the fluororesin of the invention when the innermost or outermost surface is lined or coated with the fluororesin, glass fiber, carbon fiber, aramid resin, mica, silica, talc, Celite, clay, titanium oxide, or the like may be added. In order to bond the fluororesin to metal, adhesive may be used or the metal surface may be roughened.

The fluororesin can also suitably be used as a molding material for the following molded articles.

Examples of the molded articles include:

fluid transfer components for food manufacturing devices such as food packaging films, and lining materials, packings, sealants, and sheets for fluid transfer lines used in food manufacturing processes;

liquid chemical transfer components such as plugs for chemicals, packaging films, and lining materials, packings, sealant, and sheets for fluid transfer lines used in chemical manufacturing processes;

interior lining components for liquid chemical tanks and pipes of chemical plants and semiconductor plants;

fuel transfer components such as O-rings (square rings), tubes, packings, valve core parts, hoses, and sealants used in automobile fuel systems and peripheral components thereof, and hoses and sealants used in automobile AT devices;

other automobile components such as flange gaskets of carburetors, shaft seals, valve stem seals, sealants, and hoses used in automobile engines and peripheral components thereof, and brake hoses, air conditioner hoses, radiator hoses, and electric wire coating materials for automobiles;

liquid chemical transfer components for semiconductor devices such as O-rings (square-rings), tubes, packings, valve core parts, hoses, sealants, rolls, gaskets, diaphragms, and joints of semiconductor manufacturing devices;

coating and ink components such as coating rolls, hoses, tubes, and ink containers of coating equipment;

transfer components for foods and beverages, food packaging materials, and glass cooking appliances such as tubes, hoses, belts, packings, and joints, including tubes for foods and beverages or hoses for foods and beverages;

liquid-waste transfer components such as tubes and hoses for liquid-waste transfer;

high-temperature-liquid transfer components such as tubes and hoses for high-temperature-liquid transfer;

steam pipe components such as tubes and hoses for steam pipes;

anti-corrosive tapes for pipes such as tapes to be wrapped around pipes on decks of ships;

various coating materials such as electric wire coating materials, optical fiber coating materials, transparent surface coating materials to be disposed on the light-incident surfaces of photovoltaic devices of solar cells, and agents for back surfaces;

sliding components such as diaphragms and various packings of diaphragm pumps;

weather-resistant covers such as agricultural films and a variety of roof materials and side walls;

interior materials used in the architecture field and coating materials for glass such as incombustible fire-proof safety glass; and lining materials such as laminate steel plates used in the electrical appliance field.

Examples of the fuel transfer components used in automobile fuel systems include fuel hoses, filler hoses, and evaporator hoses. The fuel transfer components may also be used as fuel transfer components for fuels containing additives for gasoline, such as those having sour gasoline resistance, alcohol fuel resistance, methyl tertiary-butyl ether resistance, or amine resistance.

The chemical plugs and packaging films for chemicals have excellent chemical resistance against acids, for example. The liquid chemical transfer components may include anti-corrosive tapes to be wrapped around pipes in chemical plants.

Examples of the molded articles also include automobile radiator tanks, liquid chemical tanks, bellows, spacers, rollers, gasoline tanks, liquid-waste transfer containers, high-temperature-liquid transfer containers, and fishery and pisciculture tanks.

Examples of the molded articles also include bumpers, door trims, and instrument panels of automobiles, food processing devices, cooking appliances, water- and oil-repellent glass, illumination-related devices, indicator panels and housings of OA equipment, electric signboards, displays, liquid crystal displays, mobile phones, printed circuit boards, electric and electronic parts, miscellaneous goods, waste containers, bathtubs, bath modules, ventilation fans, and illumination frames.

A powdery coating formed from the fluororesin is also one of useful embodiments. The powdery coating may have an average particle size of 10 to 500 μm. The average particle size may be determined using a laser diffraction particle size distribution analyzer. Spraying the powdery coating on a base by electrostatic painting and sintering the sprayed powdery coating can provide a film that is less likely to suffer blistering and cracking even when rapidly decompressed from a high-temperature and high-pressure state.

EXAMPLES

The invention will be described below referring to, but is not limited to, examples.

The parameters in the examples were determined by the following methods.

(Monomer Composition of Fluororesin)

The composition of the fluororesin was determined by $^{19}$F-NMR at a measurement temperature of melting point of the polymer+20° C. using a nuclear magnetic resonance device AC300 (Bruker-Biospin), appropriately in combination with elemental analysis in accordance with the integral values of the respective peaks and the types of the monomers.

(Melting Point)

The melting point was determined from the peak on an endothermic curve obtained by thermal analysis at a temperature-increasing rate of 10° C./min using a differential scanning calorimeter RDC220 (Seiko Instruments Inc.) in conformity with ASTM D-4591.

(Melt Flow Rate (MFR))

The MFR was defined as the mass (g/10 min) of a polymer that flowed out of a nozzle having an inner diameter of 2 mm and a length of 8 mm per 10 minutes at 297° C. under a load of 5 kg using a melt indexer (Toyo Seiki Seisaku-sho, Ltd.) in conformity with ASTM D3307-01.

(Pyrolysis Starting Temperature (1% Mass Reduction Temperature))

The pyrolysis starting temperature was determined using a thermogravimetric/differential thermal analyzer TG-DTA6200 (Hitachi High-Technologies Corp.) with 10 mg of fluororesin. The fluororesin was heated at a rate of 10° C./rain in the air atmosphere, and the temperature at which the mass of the fluororesin subjected to the heating test was reduced by 1% by mass was defined as the pyrolysis starting temperature.

(Determination of the Number of —$CONH_2$ Groups (Amide Groups) in Fluororesin)

Fragments of each powder (or pellets) of the fluororesin were compression molded at room temperature to provide a film having a thickness of 200 μm (±5 μm). Each of the resulting films was subjected to infrared absorption spectrum analysis. In the analysis, the film was scanned 128 times using Perkin-Elmer Spectrum Ver. 3.0 and the resulting IR spectrum was analyzed, so that the peak absorbance was determined.

The thickness of the film was measured using a micrometer.

The absorbance of the peak present at 2900 to 3100 $cm^{-1}$ assigned to the $CH_2$ groups in the main chain in the infrared absorption spectrum was standardized to 1.0.

The absorbance of the peak assigned to the N—H bonds in the amide groups (—$CONH_2$) present around 3400 to 3470 $cm^{-1}$ in the standardized spectrum is determined. The base line is automatically decided, and the peak height A is defined as the peak absorbance. Based on the absorbance A of the peak assigned to the amide groups (—$CONH_2$), the number of amide groups per $10^6$ carbon atoms is calculated by the following formula.

Number of amide groups per $10^6$ carbon atoms=$K \times A$

A: absorbance of peak assigned to amide groups (—$CONH_2$)
K: coefficient=4258

(Method of Preparing Sample for RGD Testing)

The resulting pellets as a material were extrusion molded into a pipe sample having an outer diameter of 90 mm and a thickness of 6 mm, and the pipe was cut into a size of 2.5 cm×5 cm. Thereby, a sample for RGD testing was obtained.

(RGD Testing)

The sample for RGD testing was put into a pressure-resistant container. The pressure and the temperature therein were increased up to 15 kpsi and 170° C. using a gas mixture of $CO_2/CH_4$=10%/90% and maintained until an equilibrium state for one week. Then, the pressure was reduced at a rate of 70 bar/min. The sample after the test without blistering or cracking passes the test.

(Analysis by Gas Chromatography Mass Spectrometry)

Headspace sampling GC/MS measurement was performed. Specifically, a 0.50-g portion of pellets was put into a 6.0-mL vial. The vial was sealed hermetically and heated at 200° C. for 30 minutes. The gas phase was immediately collected in a 2.0-mL syringe, and subjected to GC/MS (Agilent 5977A (Agilent Technologies, Inc.)).

GC/MS was performed under the following measurement conditions.

Column: DB-624 (Agilent Technologies Inc.)
Column length: 60 m, inner diameter: 320 μm, thickness: 1.8 μm
Inlet temperature: 250° C.
Gas used: helium
Flow rate: 1.4 mL/min
Oven temperature: initially 50° C. and maintained for five minutes, then increased up to 250° C. at 10° C./min and maintained for five minutes to the end
Mass spectrometry: scanning with m/z=10 to 600
Ionization: EI
Relative intensity: calculated on the basis of peak heights in MS chromatogram with m/z=51

Example 1

A 3000-L autoclave was charged with 900 L of distilled water and sufficiently purged with nitrogen. Then, 674 kg of perfluorocyclobutane was put thereinto, and the temperature and stirring rate inside the system were respectively maintained at 35° C. and 200 rpm. Next, 207 g of $CH_2$=$CHCF_2CF_2CF_2CF_2CF_3$, 62.0 kg of tetrafluoroethylene (TFE), and 18.1 kg of vinylidene fluoride (VDF) were successively put into the autoclave, and then 2.24 kg of a 50% by mass solution of di-n-propyl peroxydicarbonate (NPP) in methanol was added as a polymerization initiator so that the polymerization was started. At the same time of the polymerization start, 2.24 kg of ethyl acetate was put into the autoclave. The pressure inside the system decreased as the polymerization proceeded. Thus, a TFE/VDF gas monomer mixture (TFE/VDF: 60.2/39.8 (mol %)) was put into the autoclave and $CH_2$=$CHCF_2CF_2CF_2CF_2CF_3$ was simultaneously added in an amount of 1.21 parts relative to 100 parts of the gas mixture added so that the pressure inside the system was maintained at 0.8 MPa. The polymerization was finally stopped when the amount of the gas monomer mixture added reached 110 kg, and the pressure inside the autoclave was released to the atmospheric pressure. The resulting TFE/VDF/$CH_2$=$CHCF_2CF_2CF_2CF_2CF_3$ copolymer was brought into contact with 0.8% by mass ammonia water at 80° C. for one hour, washed with water, and dried. Thereby, 102 kg of powder was obtained.

Next, the powder was melt-extruded through a φ50-mm single screw extruder at a cylinder temperature of 290° C. Thereby, pellets were obtained.

The resulting pellets had the following composition and physical properties.

TFE/VDF/$CH_2$=$CHCF_2CF_2CF_2CF_2CF_3$=60.1/39.6/0.3 (mol %)
Melting point: 218° C.
MFR: 1.7 g/10 min (297° C. and 5 kg)
Pyrolysis starting temperature (1% mass reduction temperature): 388° C.
Number of amide groups per $10^6$ carbon atoms: 97

A container was charged with 100 g of the resulting pellets, followed by liquid carbon dioxide. Then, the pressure and the temperature inside the container were respectively set to 100 MPa and 130° C. The carbon dioxide in the container was in a supercritical state. The system was left to stand in this state for 120 hours, so that a low molecular weight component in the pellets was sufficiently extracted. Analysis by gas chromatography-mass spectrometry was performed, whereby the total ion chromatogram was obtained. Table 2 shows the peak intensity of the peak assigned to a component having a molecular weight of 202 to 903.

Example 2

The same operations were performed as in Example 1, except that the system in the container was left to stand for 24 hours.

Example 3

The same operations were performed as in Example 1, except that the pressure and the temperature inside the container were respectively set to 140 MPa and 150° C.

Example 4

The same operations were performed as in Example 3, except that the system in the container was left to stand for 24 hours.

TABLE 2

|  |  | Unit | Example 1 | Example 2 | Example 3 | Example 4 |
|---|---|---|---|---|---|---|
| Supercritical $CO_2$ extraction conditions | Temperature | °C. | 130 | 130 | 150 | 150 |
|  | Pressure | MPa | 100 | 100 | 140 | 140 |
|  | Duration | Hours | 120 | 24 | 120 | 24 |
| Peak intensity |  | — | 0 | 500 | 0 | 0 |
| Result of RGD test |  | — | Passed | Passed | Passed | Passed |

The invention claimed is:

1. A fluororesin comprising:
a vinylidene fluoride unit; and
a tetrafluoroethylene unit,
the fluororesin having a gas chromatography-mass spectrometry total ion chromatogram including a peak which is assigned to a component having a molecular weight of 202 to 903 and which has a peak intensity of 500 or lower.

2. The fluororesin according to claim 1,
wherein the vinylidene fluoride unit represents 10.0 to 70.0 mol % of all monomer units constituting the fluororesin, and
the tetrafluoroethylene unit represents 30.0 to 85.0 mol % of all monomer units constituting the fluororesin.

3. The fluororesin according to claim 1, further comprising
an ethylenically unsaturated monomer unit of at least one ethylenically unsaturated monomer selected from the group consisting of ethylenically unsaturated monomers represented by the following formula (1):

$$CX^{11}X^{12}=CX^{13}(CX^{14}X^{15})_{n11}X^{16}$$

wherein $X^{11}$ to $X^{16}$ are the same as or different from each other, and are each H, F, or Cl; and $n^{11}$ is an integer of 0 to 8, excluding tetrafluoroethylene and vinylidene fluoride; and
ethylenically unsaturated monomers represented by the following formula (2):

$$CX^{21}X^{22}=CX^{23}-O(CX^{24}X^{25})_{n21}X^{26}$$

wherein $X^{21}$ to $X^{26}$ are the same as or different from each other, and are each H, F, or Cl; and $n^{21}$ is an integer of 0 to 8,
wherein the vinylidene fluoride unit represents 10.0 to 49.9 mol % of all monomer units constituting the fluororesin,
the tetrafluoroethylene unit represents 50.0 to 85.0 mol % of all monomer units constituting the fluororesin, and
the ethylenically unsaturated monomer unit represents 0.1 to 5.0 mol % of all monomer units constituting the fluororesin.

4. A molded article comprising the fluororesin according to claim 1.

* * * * *